United States Patent [19]

Cannon

[11] 3,938,233
[45] Feb. 17, 1976

[54] HEAT TRANSFER APPARATUS

[76] Inventor: Robert B. Cannon, 3056 E. Rocklyn Road, Springfield, Mo. 65804

[22] Filed: Aug. 12, 1974

[21] Appl. No.: 496,398

[52] U.S. Cl. ........... 29/157.3 R; 165/141; 29/455 R; 228/125; 138/114; 138/111
[51] Int. Cl.² ......................................... B23P 15/26
[58] Field of Search . 29/157.3 R, 157.3 C, 157.3 D, 29/455; 165/141; 228/125; 138/114, 111

[56] References Cited
UNITED STATES PATENTS

| | | | |
|---|---|---|---|
| 2,521,369 | 9/1950 | Holm et al. ................... | 29/157.3 R |
| 3,323,585 | 6/1967 | Cannon.............................. | 165/141 |

FOREIGN PATENTS OR APPLICATIONS

| | | | |
|---|---|---|---|
| 514,550 | 12/1930 | Germany....................... | 29/157.3 C |

*Primary Examiner*—C. W. Lanham
*Assistant Examiner*—V. K. Rising
*Attorney, Agent, or Firm*—Kane, Dalsimer, Kane, Sullivan and Kurucz

[57] ABSTRACT

An improved header construction for a heat transfer apparatus of the type utilizing a plurality of concentric, longitudinally extending tubes including an inner tube, an intermediate tube and an outer tube with the intermediate tube extending beyond the outer tube and the inner tube extending beyond the intermediate tube. The header includes sealing members for the intermediate and outer tubes. Each sealing member is butt welded at one end to its associated tube. The other end of the sealing members defines a radially inwardly directed sanitary radius which is welded to an outwardly directed sanitary radius formed in a band which, in turn, is welded to the next innermost tube section. The method of assembling a header in accordance with the above is also provided.

4 Claims, 2 Drawing Figures

HEAT TRANSFER APPARATUS

BACKGROUND OF THE INVENTION

The present invention relates to heat exchange devices and more particularly to a header structure for use with a multiple tube heat transfer or heat exchange apparatus.

In my U.S. Pat. No. 3,651,551, I provide a method of assembling a heat transfer apparatus utilizing a header structure that requires flanges, gaskets, nuts, bolts and a multitude of machine and fitted parts in order to complete a working unit. Although the finished and assembled header structure functions satisfactorily, it is a relatively costly item to produce. The primary object of the design disclosed in my above referenced patent was to provide a header structure that could be readily disassembled for inspection and cleaning when used in a sanitary operation such as in the conveying of milk or milk products.

In the past few years, sanitarians have recognized that a properly designed and completely constructed tubular heat exchanger can be cleaned and sanitized in the assembled condition thus eliminating the need to disassemble the component parts for manual washing and to dispense with the requirement that the interior surfaces of the heat exchanger be available for inspection. It has been established that an all welded tubular heat exchanger can be efficiently and effectively cleaned by circulating, washing and sanitizing solutions through the interior areas at fairly high velocities (7 ft. per second and up). This system, known as a CIP or "cleaned in place" system, is widely accepted in the milk processing industry as being highly superior to the former method of disassembly and hand or manual washing of processing equipment parts.

There are certain critical features that must be incorporated into the design of a tubular heat exchanger in order to provide a unit of processing equipment that will be considered suitable for cleaning in place. These features, set forth in the 3-A SANITARY STANDARDS FOR TUBULAR HEAT EXCHANGERS FOR MILK AND MILK PRODUCTS formulated jointly by the International Association of Milk, Food and Environmental Sanitarians, the United States Public Health Service and the Dairy Industry Committee include the following:

1. Self-draining of the product channel or channels.
2. Elimination of pockets and dead ends in the product flow channels.
3. Maintenance of a uniform area throughout the products flow channel in order to maintain a uniform velocity of the cleaning solution through this area during the cleaning cycle.
4. All interior angles of 135° or less, within the product flow area, must have a sanitary radius.

The term "sanitary radius" as defined in the 3-A Standards is a radius of at least 1/32 inch for circular cross-sectional tubing and 150 inch on all non-circular cross-sectional tubing.

The heat exchanger set forth in my previously described patent provides the first three of the requirements set forth above. A principal object of the present invention is to provide an improved header structure for a heat exchange device such as that described in my previous patent which further incorporates the fourth 3-A Sanitary Standards requirement so as to provide a heat exchange apparatus which fully complies with the requirements for a clean in place system.

The above and other beneficial objects and advantages are attained in accordance with the present invention by providing an improved header for a heat transfer apparatus of the type utilizing a plurality of longitudinally extending concentric tubes including an inner tube, an intermediate tube and an outer tube with one end of the intermediate tube extending longitudinally beyond the outer tube and the corresponding end of the inner tube extending longitudinally beyond the end of the intermediate tube. The header includes sealing members for the intermediate and outer tubes. Each sealing member is butt welded at one end of its associated tube. The other end of the sealing members defines an inwardly directed sanitary radius which is welded to an outwardly directed sanitary radius formed in a band which, in turn, is welded to the next innermost tube section. The method of assembling a header in accordance with the above is also provided.

DETAILED DESCRIPTION OF THE PREFERRED EMBODIMENT

Figure 1:
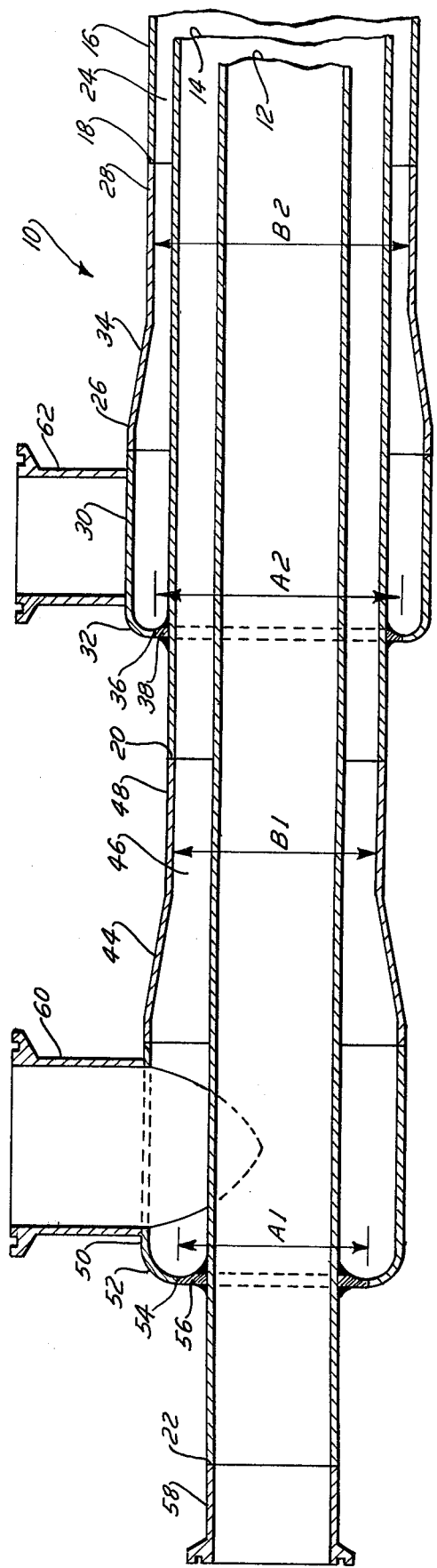
FIG. 1 is a side elevational sectional view of the header of a heat exchange apparatus in accordance with the present invention; and, FIG. 2 is a fragmentary enlarged side elevational sectional view of a portion of the header arrangement.

In my previously issued U.S. Pat. No. 3,651,551, there is disclosed in FIGS. 1, 2 and 3 a heat transfer apparatus of the type comprising a plurality of radially spaced apart concentrically mounted elongated tubular elements. The present invention relates to a similar exchange device and more particularly to the header structure for such a device. Referring to FIG. 1, the present heat exchange device 10 is shown comprising a plurality of concentric, longitudinally extending tubular elements including inner tube 12, intermediate tube 14 and outer tube 16. In most operations, the intermediate tube 14 contains the product to be heated and the inner and outer tubes contain the heat transfer medium. There are, however, a number of installations that require a regenerative type of heat exchanger which utilizes all of the flow channels for the passage of the product. Thus, all of the components of all three channels and the header structure must meet sanitary requirements for food handling equipment. Accordingly, the entire structure is formed of a corrosion resistant metal such as stainless steel of the AISI 300 series or corresponding ACI types.

The outer tube 16 terminates at a first end 18. The intermediate tube 14 extends beyond the end 18 of outer tube 16 and terminates at an end 20. Similarly, the inner tube 12 extends beyond the end 20 of the intermediate tube and terminates at an end 22.

In accordance with the present invention, the channel 24 defined between the intermediate and outer tube is sealed at end 18 by a sealing member 26. The sealing member 26 comprises an elongated section of tubing having a first end 28, the diameter of which is equal to the diameter of the outer tube 16, an opposite end 30 terminating in a sanitary radius 32, and an intermediate section 34 wherein the diameter of the tube increases gradually over an extended length. The sealing member end 28 is butt welded to the end 18 of outer tube 16.

Figure 2:
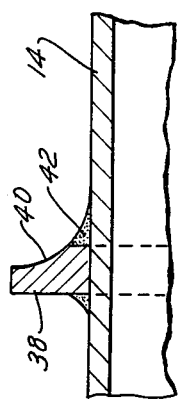

Similarly, the free end 36 of sanitary radius 32 is butt welded to a band 38 which, in turn, is welded to the intermediate tube 14 as shown in FIG. 2.

Band 38 comprises an arcuate member in section which extends upwardly from the outer surface of intermediate tube 14 along a sanitary radius 40. The band is carefully welded to the intermediate tube in a manner such that, after grinding and polishing, the welded material on the outside of channel 24 blends with and continues the sanitary radius as shown in FIG. 2.

In a similar manner, sealing member 44 seals the end of channel 46 defined between inner tube 12 and intermediate tube 14. The construction and the manner of joining sealing member 14 in position is identical with that just described for sealing member 26. Accordingly, sealing member 44 includes a first end 48 butt welded to the free end 20 of intermediate tube 14. The opposite end 50 of sealing member 44 terminates in a plateau which ends in a sanitary radius 52 having a free end 54 butt welded to a band 56 identical in construction with that depicted in FIG. 2.

A suitable fixture 58 for connection of the present heat exchanger with auxiliary equipment is butt welded to the free end 22 of inner tube 12. Similarly, Fixtures 60 and 62 are welded to the plateaus defined by the ends 50 and 30 respectively of sealing members 44 and 26.

The heat transfer apparatus of the present invention is assembled by first fitting concentric tubes 12, 14 and 16 so that end 22 extends beyond end 20 which, in turn, extends beyond end 18 as depicted. The method of joining the tubes is disclosed in my previous patent. After the tubes are assembled, band 38 is welded about the periphery of the intermediate tube. The welded material 42 directed toward the channel is then carefully ground, polished and cleaned to blend with the sanitary radius of band 38. Thereafter, sealing member 26 is positioned in place and end 28 of the sealing member is butt welded to end 18 of the outer tube 16. End 36 of the sealing member is then butt welded to the free end of band 38. Fixture 62 may be prewelded to sealing member 26 or else welded in position in situ.

A similar procedure is then followed with respect to sealing member 44. That is, band 56 is welded into position after which the internal surfaces of the weld are carefully cleaned and polished so as to form a smooth sanitary radius. End 48 of member 44 is then butt welded to the first end 20 of intermediate member 14 and the opposite end 54 of member 44 is then butt welded to the free end of band 56.

In order to assemble the sealing members 26 and 44, it is critical that the minimum inside diameters of these pieces be slightly greater than the maximum outside diameters of bands 38 and 56 respectively. That is, the diameter A1 must be less than the diameter B1 and the diameter A2 must be less than B2. This allows member 26 to slide over member 38 for assembly and member 44 to slide over member 56.

Thus, in accordance with the above, a heat exchange device in accordance with the present invention is provided.

Having thus described my invention, what is claimed is:

1. The method of assembling a header for a heat transfer apparatus having a plurality of longitudinally extending, concentrically mounted heat transfer tubes including an outer tube having a first end, an intermediate tube having a first end extending longitudinally beyond said outer tube first end and an inner tube having a first end extending longitudinally beyond said intermediate tube first end, said method comprising the steps of:
   a. welding a band member about said intermediate tube, said band member extending radially outwardly along a sanitary radius from said intermediate tube to a free end;
   b. cleaning and polishing the band so as to form a smooth continuation of the sanitary radius blending into the intermediate tube;
   c. forming an outer tube sealing member comprising a section of tubing of increasing diameter having a first end with a diameter equal to the diameter of said outermost tube and a second end defined by a radially inwardly directed sanitary radius;
   d. butt welding the first end of said outer tube sealing member to said outer tube first end;
   e. butt welding the second end of said sealing member to said band member free end.

2. The method in accordance with claim 1 comprising the further steps of:
   a. welding a second band member about said inner tube, said second band member extending radially outwardly along a sanitary radius from said inner tube to a free end;
   b. cleaning and polishing the band so as to form a smooth continuation of the sanitary radius blending into the inner tube;
   c. forming an intermediate tube sealing member comprising a section of increasing diameter having a first end with a diameter equal to the diameter of the intermediate tube and a second end defined by a radially inwardly directed sanitary radius;
   d. butt welding the first end of the intermediate tube sealing member to the intermediate tube first end; and,
   e. butt welding the second end of the intermediate tube sealing member to the second band member free end.

3. The method in accordance with claim 1 wherein the outer tube sealing member is formed with an access opening.

4. The method in accordance with claim 2 wherein the intermediate tube sealing member is formed with an access opening.

* * * * *